United States Patent Office.

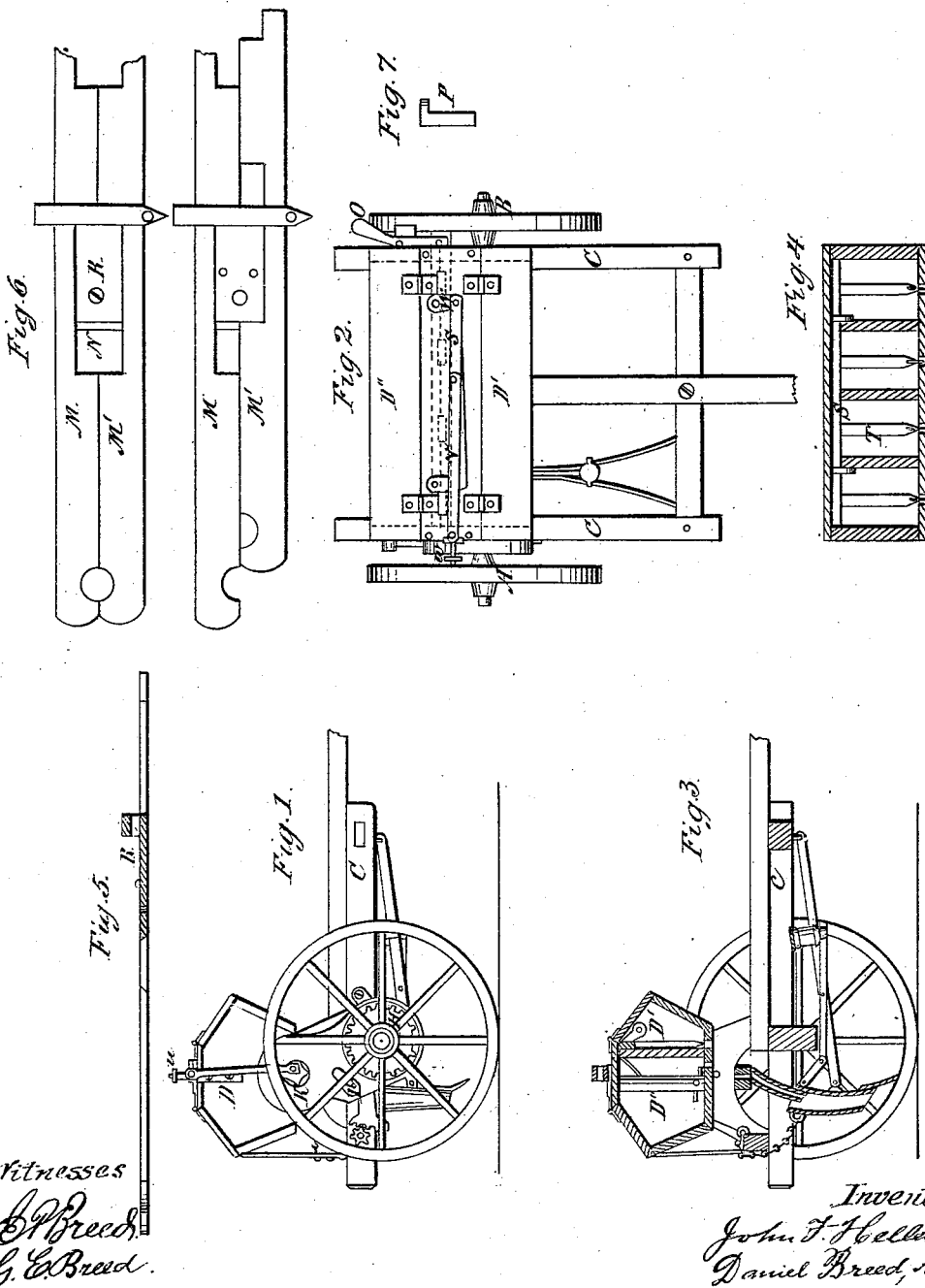

JOHN F. KELLER, OF GREENCASTLE, PENNSYLVANIA.

Letters Patent No. 61,543, dated January 29, 1867.

IMPROVEMENT IN SEED DRILLS.

*The Schedule referred to in these Letters Patent and making part of the same.*

TO ALL WHOM IT MAY CONCERN:

Be it known that I, JOHN F. KELLER, of Greencastle, in the county of Franklin, and State of Pennsylvania, have invented a new and useful Improvement in Seed Planter and Guano Attachments; and I do hereby declare that the following is a full and exact description thereof, reference being had to the accompanying drawings, and to the letters of reference marked thereon.

My invention consists in so constructing and operating the feed-slides or feed-regulators of seed planters as to increase or diminish both the length and the width of the feed-holes in order to feed through a square or nearly square hole instead of using a long narrow feed-hole, which is liable to clog, especially with guano; and secondly, in using peculiar sharp-edged plates for the feed-slides to cut against; and thirdly in a peculiar arrangement of stirrer or feed-agitator. In the accompanying drawings—

Figure 1 is a side view of my improved seed planter.
Figure 2 is a top view of the same, only one of the drag-bars being represented.
Figure 3 is a longitudinal section of the machine.
Figure 4 is a detached view, showing the feed-agitator in the hopper.
Figure 5 is a detached view of the feed-slide and sharp-edged plate.
Figure 6 is a detached view of the feed-slides.
Figure 7 is a detached view of the half-bolt.

In my improved wheat drill the feed-slides are made in two pieces or strips, as seen at M M', fig. 6. These two strips are so arranged as to be operated either separately or both together, as will be soon explained. When both are operated together or as one slide, a large square feed-hole is opened, as seen at N, fig. 6; but in case slow feeding is desired then one of the strips M' is left shut while the other half is more or less opened. Thus, one-fourth of the larger hole may be opened and yet have a square hole, which is less liable to clog than a long narrow hole, especially with guano when a little damp. The motion of these two pieces of the feed-slide is produced as follows: The lever O, fig. 2, is bolted to the strip M so as to operate the same in the usual manner, while the strip M' may be connected or disconnected with this lever at pleasure. The lever O is cast with a half-bolt to fit into the half-hole in the strip M; and then, by using a removable half-bolt, P, fig. 7, the strip M' may be locked to the lever O or released at pleasure. Thus either or both halves of the feed-slide may be used. The feed-slides M M' are cast with sharp edges working against the sharp edges of plate R, fig. 5, in order to cut clean and prevent clogging. My improved feed-agitator is best seen in fig. 4. The bar S carries several fingers, T, the tips of which pass down into the holes in the bottom of the hopper, so as to insure the clearing of these holes. The bar S and fingers are moved to the right and left in the usual manner by means of a crank-lever, U, and connecting-bar, V, which is attached to the arm W upon the bar S, as seen in fig. 2.

Other features shown in the above drawing are not fully described, as many of them are covered by patents already granted to me, and others are covered by applications for separate patents which I now desire to obtain, which applications are filed herewith.

Having thus fully described my invention, what I claim, and desire to secure by Letters Patent of the United States, is—

1. Enlarging and diminishing both the length and the width of the feed-holes of seed planters in order to prevent clogging and secure uniformity of discharge, whether slow or fast, substantially as set forth.

2. I claim the arrangement and combination of the two pieces M and M' of the feed-slide, substantially in the manner and for the purpose described.

3. I claim the sharp-edged plates R, fig. 5, in combination with the sharp edges of the slides M M', substantially as set forth.

4. I also claim the use of the half-bolt, fig. 7, for locking the strip M to the lever O, substantially as set forth.

JOHN F. KELLER.

Witnesses:
EDM. F. BROWN,
DANIEL BREED.